April 26, 1932. C. WASHBURN 1,855,931
LICENSE PLATE FASTENER
Filed Oct. 16, 1931
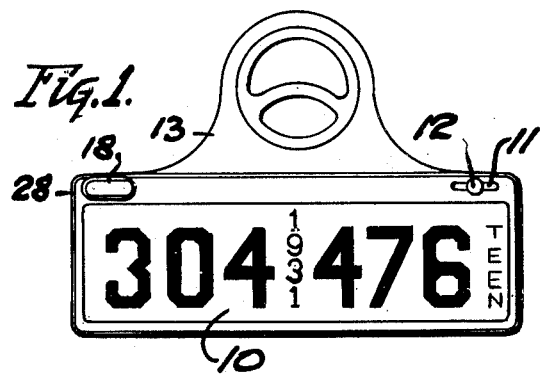
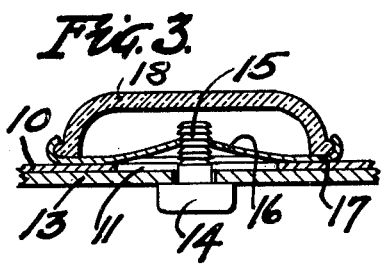
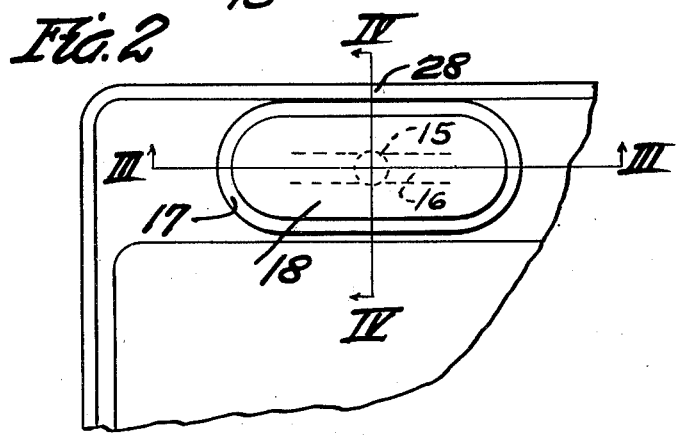
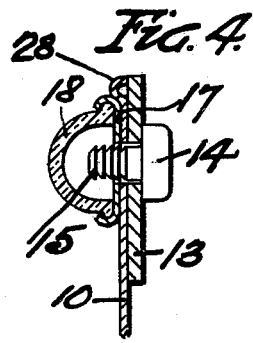
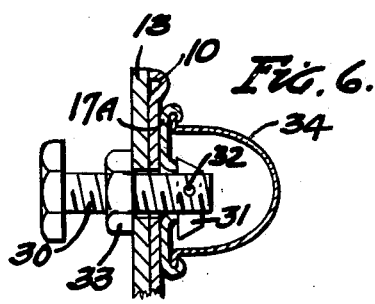
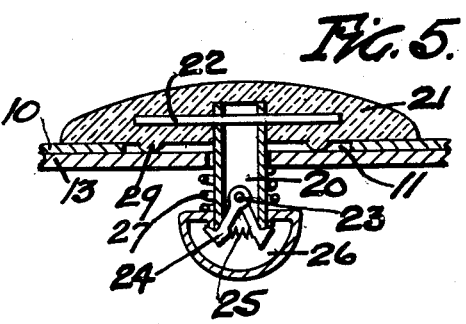
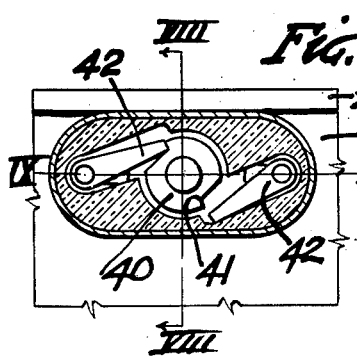
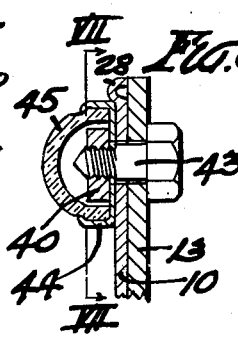
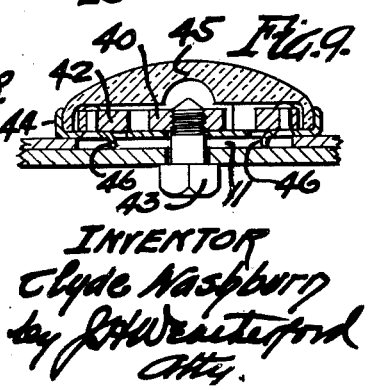
INVENTOR
Clyde Washburn Patented Apr. 26, 1932

1,855,931

UNITED STATES PATENT OFFICE

CLYDE WASHBURN, OF MEMPHIS, TENNESSEE

LICENSE PLATE FASTENER

Application filed October 16, 1931. Serial No. 569,176.

This invention relates to improvements in means of protection for license tags issued by the various State governments and used connection with motor driven vehicles, whereby such tags, when once attached to a vehicle for which they were originally issued may not be removed without detection.

The objects of this invention are:

To provide means for securing a license tag to the holder therefor and protecting means in connection therewith which must be destroyed in order to permit release and removal of the securing means;

A further object is to provide a protecting means which is easily and readily identifiable so that it may be possible to detect, even in the case of a swiftly approaching or receding vehicle, whether the securing device has been tampered with; and To provide a securing means which may be easily disengaged after the protecting means has been destroyed.

The means by which the foregoing and other objects are accomplished and the manner of their accomplishment will readily be understood from the following specification on reference to the accompanying drawings, in which:

Fig. 1 is a face view of a license tag secured to a license bracket and employing my improved protecting means;

Fig. 2 is an enlarged fragmentary face view of a corner of the same license plate showing the device approximately full size;

Figs. 3 and 4 are respectively sections taken on the lines III—III and IV—IV of Fig. 2, showing one form of securing means and the protecting means therefor;

Fig. 5 is a section taken as on the line III—III of Fig. 2, showing a modified form of securing means;

Fig. 6 is a transverse section showing a further modified form of securing means; and showing a modified form of protecting means; and Figs. 7, 8 and 9 are sectional views respectively on the line VII—VII of Fig. 8, and VIII—VIII and IX—IX of Fig. 7, showing a still further modification of the attaching means.

Referring now to the drawings in which the various parts are indicated by numerals 10 is a license plate of typical form having slots 11 therein, through which bolts 12 or other securing devices may be passed to attach the plate to a license bracket 13.

In the form of device shown in Figs. 2, 3 and 4 one end of the license bracket is secured by a short bolt 14 having circumferential grooves 15 which are engaged by spring tongues 16, which engage the grooves in the bolt and prevent its removal when the parts are pushed to place.

These tongues are struck up from a holder 17 in which is secured a fragile cover 18 which latter is preferably of glass or porcelain with a highly polished exterior surface capable of reflecting light, and which may be distinctly colored so that by daylight it may readily be seen and so that by reflection by a headlight of another vehicle at night will also be distinctly visible. To attach this structure the license plate is positioned properly relatively to the license plate holder, the holder 17 is placed in proper position against the face of a license plate, and the bolt is inserted through the bracket and license plate and pushed into engagement with the spring tongues of the holder thus firmly securing these parts together and securing the license plate to the bracket. In order to remove the license plate it is thereafter necessary to entirely destroy the fragile cover thereby making the spring tongues readily accessible and permitting their disengagement from the bolt to allow its removal and the release of the plate.

In Fig. 5, 20 is the securing bolt which is in the form of a tubular member one end of which is secured in a fragile cover 21, preferably by means of a pin 22 around which and the end of the bolt the fragile member 21 is molded or cast. Hingedly secured in the opposite end of the bolt as by the pin 23 are dogs 24 which are forced apart as by a spring 25. 26 is a hollow locking member which is apertured to receive the bolt 20, which locking member when forced over the end of the bolt is engaged by the dogs 24 and cannot thereafter be removed. Preferably a spring 27 is disposed between the locking member 26 and the bracket 13 in order that the license plate 10 may be firmly held against the bracket at all times and rattling be prevented. The fragile cover 21, or 18, is held from turning under ordinary conditions by a bead 28 formed around the edge of the license plate 10 but should such bead be deemed insufficient for the purpose the cover 21 may be provided with lugs 29 which engage in the license plate slot 11 and prevent such turning.

To engage this form of the device the parts are pushed together as before described. To remove the device the fragile cover 21 is broken after which the pin 22 may be driven out and the bolt structure removed through the license plate and holder. In this form of device as before the fragile member 21 is preferably highly polished and colored.

In Fig. 6, a still further form of detaching device is shown in which the attaching bolt is provided with a dog 31 pivotally secured as by the pin 32 adjacent the end, one end of the dog being longer than the other so that it will inevitably swing into a transverse position when the bolt is inserted through the license bracket 13, the license plate 10 and the cover holder 17A. After the bolt 30 is inserted and the dog 31 drops to place the parts may be securely clamped together by a nut 33. It will be noted however that loosening of this nut does not provide means for straightening the dog 31 into alignment with the bolt or thereby permit its removal. Secured in the holder 17A is a cover 34 for the lock which as before may be of fragile material, or which as here shown may be of thin metal which is easily collapsed, as by the lick of a hammer, to permit access to the bolt lock and allow its disengagement and removal. This cover in such case is exteriorly highly polished and painted such color as may be desired.

In Figs. 7, 8 and 9 a still further form of securing means is shown. This means comprises a cylindrical nut 40 having oppositely disposed notches 41 therein, which are engaged by either of two pivotally secured dogs 42 and thereby held against rotation in one direction but in no way restrained from rotation in opposite direction.

Cooperating with the nut 40 is a threaded bolt 43, which tightly fits the nut 40 so that when once engaged with the nut considerable effort is required to disengage them. The notches 41 and dogs 42 are so disposed that they hold the nut against turning while the bolt is being screwed thereinto but present no resistance to turning of the nut when attempt is made to remove the bolt therefrom. 44 is the cover holder, and 45 the fragile cover. This retainer and cover may be held against rotation by the bead 28 on the license plate 10, or lugs 46 may extend down from the retainer into the license plate slot 11.

Having described my invention, what I claim is:

1. The combination with a holder, a part to be secured thereto, and means for securing said part to said holder comprising a threaded bolt, a rotatable nut cooperating therewith, means engaging the periphery of said nut for preventing rotation of said nut when said bolt is being tightened, and permitting opposite rotation, and a fragile cover disposed over and around said nut and rotation preventing means, said cover being secured in place by said securing means, and when so secured rendering said nut and associated means inaccessible, destruction of said cover being prerequisite to release of said securing means.

2. The combination with an apertured holder and an apertured member to be secured thereto, said member having identification indicia on a face thereof, of a bolt passing through said apertures and having the threaded end thereof projecting beyond said face, and a member cooperating with said bolt to secure said holder and plate together, said latter member comprising an apertured base plate, a nut disposed against said base plate and having notches in the peripheral edge thereof, dogs pivotally secured to said base member and engaging said notches to prevent rotation of said nut when said bolt is being tightened, but releasing said nut for free rotation with said bolt on reverse turning thereof, and a hollow fragile cover enclosing said nut, dogs and bolt end, and peripherally secured to said base plate, said cover preventing access to said nut until destroyed.

In testimony whereof I hereunto affix my signature.

CLYDE WASHBURN.